United States Patent [19]

Merrill

[11] Patent Number: 4,489,744
[45] Date of Patent: Dec. 25, 1984

[54] LIQUID BLOCKING CHECK VALVE

[75] Inventor: John T. Merrill, Pleasant Hill, Calif.

[73] Assignee: The United States of America as represented by the United States Department of Energy, Washington, D.C.

[21] Appl. No.: 425,142

[22] Filed: Sep. 27, 1982

[51] Int. Cl.³ ............................................. F16K 31/32
[52] U.S. Cl. ..................................... 137/202; 137/433
[58] Field of Search .................. 137/202, 433, 533.11, 137/519.5

[56] References Cited

U.S. PATENT DOCUMENTS

| | | |
|---|---|---|
| 1,038,518 | 9/1912 | Bardo . |
| 3,002,522 | 10/1961 | Klinefelter . |
| 3,202,168 | 8/1965 | Klinefelter . |
| 3,727,629 | 4/1973 | Gilford . |
| 3,759,281 | 11/1971 | Falcuta ............................ 137/433 X |
| 3,786,829 | 1/1974 | Nardo ................................... 137/202 |
| 4,236,759 | 12/1980 | Lyrenko ........................ 137/519.5 X |
| 4,413,615 | 11/1983 | Sigworth ......................... 137/433 X |

FOREIGN PATENT DOCUMENTS 537849  1/1956  Italy ................................. 137/519.5

Primary Examiner—Alan Cohan
Attorney, Agent, or Firm—L. E. Carnahan; Roger S. Gaither

[57] ABSTRACT

A liquid blocking check valve useful particularly in a pneumatic system utilizing a pressurized liquid fill chamber. The valve includes a floatable ball disposed within a housing defining a chamber. The housing is provided with an inlet aperture disposed in the top of said chamber, and an outlet aperture disposed in the bottom of said chamber in an offset relation to said inlet aperture and in communication with a cutaway side wall section of said housing.

12 Claims, 1 Drawing Figure

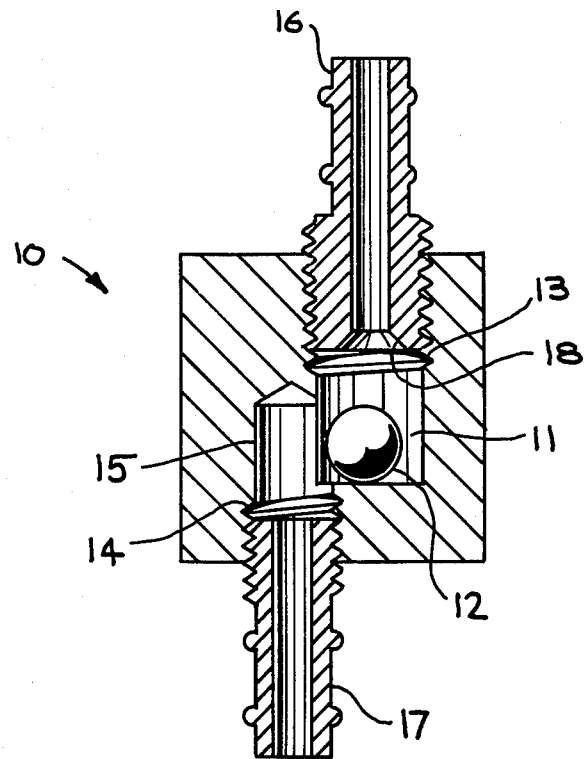

4,489,744

LIQUID BLOCKING CHECK VALVE

BACKGROUND OF THE INVENTION

The invention described herein arose at the Lawrence Livermore National Laboratory in the course of, or under, Contract No. W-7405-ENG-48 between the University of California and the United States Department of Energy.

The present invention relates to check valves, particularly to liquid blocking check valves, and more particularly to a liquid blocking check valve which allows passage of gas in both directions but prevents back flow of a liquid.

Various applications involve the passage of gas and/or liquid in one direction while requiring only the passage of gas in the opposite direction. For example, back pressure in a pneumatic system utilizing a pressurized liquid fill chamber can develop which displaces liquid into the gas lines, and can result in filing regulators and gauges with liquid, thereby causing damage or improper operation thereof.

Check valves have long been known in the art for allowing liquid and/or gas to pass in one direction, but preventing passage in the opposite direction, as exemplified by U.S. Pat. No. 1,038,518 issued Sept. 17, 1912 to F. J. Bardo. Also, check valve arrangements are known for use in fluid heating systems for controlling the release of gas in the system while preventing discharge of the fluid therefrom, as exemplified by U.S. Pat. No. 3,002,522 and No. 3,202,168 issued Oct. 3, 1961 and Aug. 24, 1965, respectively, to G. B. Klinefelter.

In addition, U.S. Pat. No. 3,727,629 issued Apr. 17, 1973 to R. T. Gifford utilizes a vacuum check valve arrangement in conjunction with surgical drainage or suction apparatus, including a conically shaped float valve, such that when the level of the liquid in the collecting vessel rises sufficiently the float valve is lifted to prevent liquid from entering the suction line.

While the various prior art approaches have been developed to resolve specific problems, there is a need in the art for a way of minimizing problems associated with back pressure, such as in the above-mentioned pneumatic system which uses a pressurized liquid fill chamber. Thus, there has been a need for a simple yet effective means for allowing free passage of gas back and forth, while preventing back flow of liquid.

SUMMARY OF THE INVENTION

The present invention provides an effective, but simple and inexpensive means for solving the above mentioned back pressure fluid flow problems. This is accomplished by providing a liquid blocking check valve which allows free passage of gas such as air and/or liquid in one direction, and will allow free passage of gas in the opposite direction but prevent passage of liquid in said opposite direction.

Therefore, it is an object of this invention to provide a liquid blocking check valve.

A further object of the invention is to provide a check valve arrangement which allows free passage of gas such as air in both directions but prevents passage of liquid in one direction.

Another object of the invention is to provide a liquid blocking check valve which utilizes a floatable member that allows passage of gas in both directions and allows passage of liquid in one direction only.

Another object of the invention is to provide a check valve arrangement for use in a pneumatic system for preventing return of liquid due to back pressure in the system while allowing free passage of air.

Other objects of the invention will become readily apparent to those skilled in the art in view of the following description and the accompanying drawing.

The above objects of the invention are carried out by a liquid blocking check valve having a housing defining a chamber with a pair of oppositely located openings in said chamber, one of the openings being axially offset from the other of said openings and having an elongated section extending along one wall of the housing, a floatable member disposed in the chamber. The valve operates such that there is free passage of gas and/or liquid through the chamber in one direction and full passage of gas through the chamber in the opposite direction but passage of liquid in the opposite direction is prevented by said floatable member being raised by the liquid and blocks said other of the openings. The elongated section of the one opening being constructed such that movement of the floatable member thereagainst does not prevent passage of air and/or liquid therethrough.

BRIEF DESCRIPTION OF THE DRAWING

The single FIGURE is a cross-sectional view of an embodiment of a liquid blocking check valve made in accordance with the invention.

DETAILED DESCRIPTION OF THE INVENTION

The present invention is directed to a liquid blocking check valve which allows free passage of air or other gas in both directions but prevents passage of a liquid in one direction.

While not limited to any specific use, the invention is particularly applicable for use in pneumatic systems having a pressurized liquid fill chamber for preventing return of any liquid, such as water, from the fill chamber due to back pressure in the system, while allowing free passage of air back and forth.

Referring now to the drawing, the liquid blocking check valve comprises a housing 10 defining therein a chamber 11, within which is located a liquid floatable spherically configured member or ball 12. Housing 10 is provided at the top and bottom thereof with a pair of threaded aperatures 13 and 14, respectively. Top aperture 13 is located substantially centrally in chamber 11, while bottom aperture 14 is located in an axial offset relation to aperture 13 and at one side of chamber 11.

Housing 10 is also provided with a cutaway or groove 15 in the wall of chamber 11 adjacent bottom aperture 14. Cutaway 15 is of a rectangular configuration constituting a partial elongation of bottom aperture 14 and having a length greater than the diameter of ball 12 but with a width less than the diameter of ball 12 such that ball 12 cannot block passage of air and/or liquid through cutaway 15 and associated bottom aperture 14. By locating aperture 14 and cutaway 15 at the side of chamber 11, ball 12 is not lifted on a column of air resulting in undesired blocking of aperture 13. A hollow threaded inlet adaptor or connector member 16 is secured in top aperture 13 while a hollow threaded adapter or connecter member 17 is secured in bottom aperture 14. Adapter 16 is provided with a concave inner end section defining a seat 18 configured to cooperate with ball 12 as described below.

Adaptor 16, for example, may be connected via tubing or conduits (not shown) to associated filling regulators and gauges of the above-mentioned pneumatic system, while adapter 17 may be connected to a pressurized liquid fill chamber of that system. With such an arrangement, air and/or liquid under pressure is normally directed into adapter 16, through chamber 11 and out via cutaway 15 and adapter 17 to the fill chamber or elsewhere, floatable ball 12 not blocking passage therethrough due to the configuration of cutaway 15. Should back pressure in the fill chamber build up or if the inlet pressure is reduced, air can flow freely back through adapter 17, cutaway 15, chamber 11 and out through adapter 16. However, should liquid, such as water, enter chamber 11 via adapter 17 and cutaway 15, the ball or member 12 floats to the top of chamber 11 and against seat 18 of adapter 16 creating a seal therebetween and blocking passage of liquid out of chamber 11. Upon reapplying air pressure in the forward direction, through adapter 16 into chamber 11, the pressure pushes ball 12 away from seat 18 and purges chamber 11 of any liquid therein by forcing such out through cutaway 15 and adapter 17, whereby the ball 12 returns to the bottom of chamber 11 allowing free flow through the chamber.

As pointed out above, provision of cutaway 15 and the positioning of aperture 14 adjacent the side of chamber 11 allows free passage of air both ways through the chamber and prevents ball 12 from being lifted by a column of air and inappropriately blocking or partially blocking the air from leaving chamber 11 via adapter 16.

It is understood that the floatable ball or member 12 is constructed of material compatible with the liquid in the associated system and is of such construction that it will readily float upon entry of any liquid into chamber 11 via cutaway 15. Examples of construction which can provide the appropriate weight or density of ball 12 are to make it of a light material such as a plastic (e.g., polyethylene, or nylon) or aluminum and/or with an inner void.

If desired, the opening 13 in housing 10 can be reduced in diameter and a seat formed on the inner surface of the housing wall about the opening to cooperate with the ball 12, thus eliminating the forming of the seat 18 on the adapter 16, whereby an adapter similar in construction to adapter 17 can be used in opening 13. Also, the floatable member or ball 12 need not be of a spherical configuration, but can be constructed to have a spherical upper end which mates with a similarly configured seat to form the seal as liquid comes into the chamber from opening 14.

It has thus been shown that the present invention provides an advance in the state of the check valve art by providing an effective, yet simple check valve arrangement which allows free passage of gas both ways therethrough but blocks passage of liquid in one direction. The liquid blocking check valve of this invention has solved the above-mentioned need, particularly the back pressure problems in pneumatic systems utilizing pressurized liquid fill chambers.

While a particular embodiment of the invention has been illustrated and described, modifications will become apparent to those skilled in the art, and it is intended to cover in the appended claims, all such modifications as come within the scope of this invention.

What is claimed is:

1. A liquid blocking check valve which allows free passage of gas in opposite directions but prevents passage of liquid in one direction, comprising:
    a housing defining a chamber therein, said housing being provided with a pair of apertures therein in communication with said chamber, a first of said pair of apertures being located opposite from and in an offset relation to a second of said pair of apertures, said housing also being provided with a longitudinally extending cutaway section forming an elongation of a side wall of said chamber and adjacent said first of said pair of apertures, and
    a floatable member positioned in said chamber, whereby gas and/or liquid can freely pass via said second operature through said chamber and outwardly through said cutaway section and said first aperture, and gas can freely pass backwardly through said chamber, but any liquid entering said chamber via said cutaway section causes said floatable member to move against and block said second aperture preventing passage of liquid therethrough.

2. The liquid blocking check valve of claim 1, wherein said cutaway section of said housing has a length greater than said floatable member and a width less than said floatable member.

3. The liquid blocking check valve of claim 2, wherein said floatable member is provided with at least a section thereof having a substantially spherical configuration.

4. The liquid blocking check valve of claim 1, additionally including a member having a passageway therethrough positioned in said second of said pair of apertures, said member being provided with an inner end portion configured to form a seat for said floatable member creating a seal therebetween when said floatable member is moved thereagainst.

5. The liquid blocking check valve of claim 4, wherein said inner end portion of said member is provided with a concave configuration, and wherein said floatable member is configured as a ball.

6. The liquid blocking check valve of claim 4, wherein said cutaway section of said housing is of a rectangular configuration, wherein said floatable member is of a ball-shaped configuration, and additionally including an adapter member having a passageway therethrough positioned in said first of said pair of apertures.

7. In a pneumatic system utilizing a pressurized source and a pressurized liquid fill chamber, the improvement comprising means positioned between said source and said fill chamber for allowing free passage of gas back and forth therethrough while blocking passage of liquid caused by back pressure, said means comprising:
    a housing defining a chamber therein having a pair of apertures in fluid communication with and located at opposite ends of said chamber, one of said pair of apertures being axially offset with respect to the other of said pair of apertures, said housing also being provided with a longitudinally extending groove in fluid communication with said chamber and said one of said pair of apertures,
    a liquid floatable member located in said chamber, and
    means associated with said other of said pair of apertures for forming a seat adapted to cooperate with said liquid floatable member for forming a seal therebetween and blocking passage of liquid from said chamber through said other of said pair of apertures.

8. The improvement of claim 7, wherein said seat forming means comprises an adapter member secured in said other of said pair of apertures and having an inner end surface forming said seat.

9. The improvement of claim 8, wherein said liquid floatable member is of a ball-shaped configuration, and wherein said seat on said adapter member is of a concave configuration.

10. The improvement of claim 7, wherein said longitudinally extending groove of said housing has a length greater than said liquid floatable member and a width less than said liquid floatable member.

11. The improvement of claim 10, wherein said liquid floatable member is of a substantially spherical configuration, and additionally including a second adapter member secured in said one of said pair of apertures.

12. The liquid blocking check valve of claim 1, wherein said second of said pair of apertures is located substantially centrally in one end of said chamber, and wherein said first of said pair of apertures is located in an opposite end of said chamber and in an axial offset relation to said second of said pair of apertures such that said first and second apertures are in a totally non-aligned relationship.

* * * * *